A. PATTERSON.
Harrow Teeth.
No. 83,656.
Patented Nov. 3, 1868.
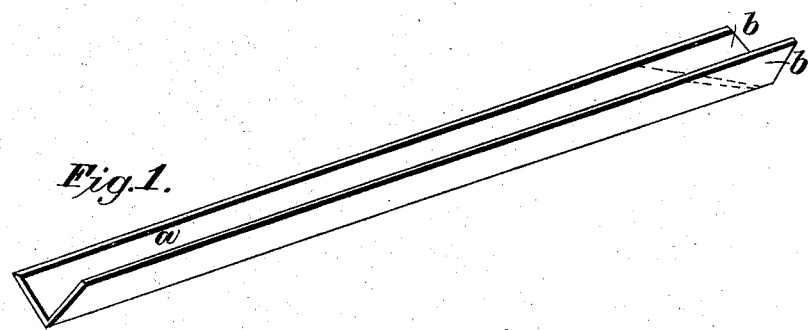
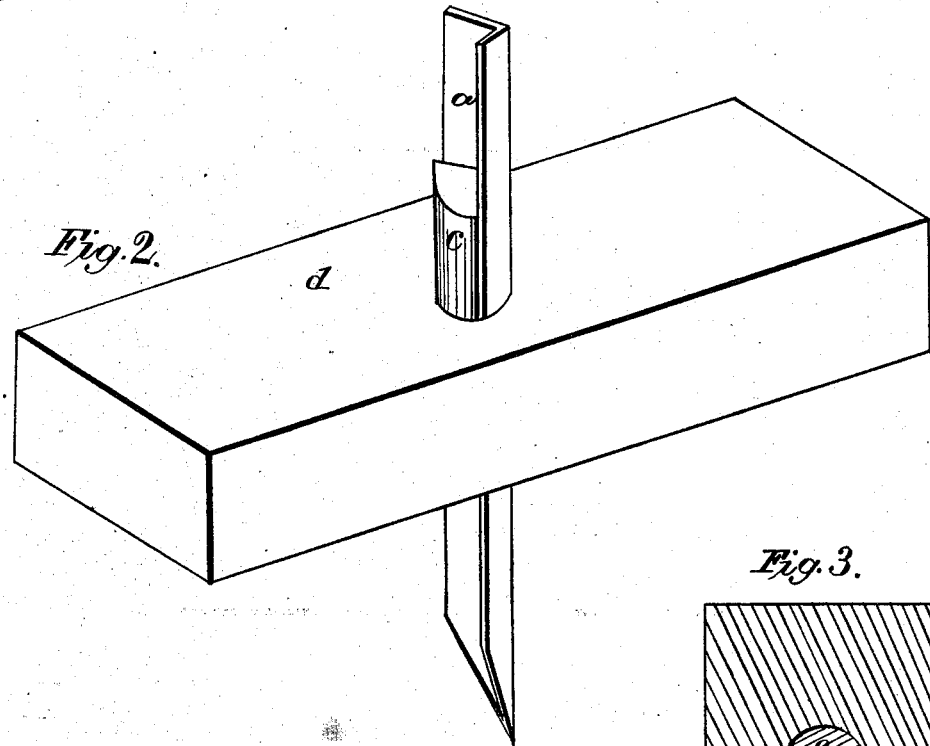
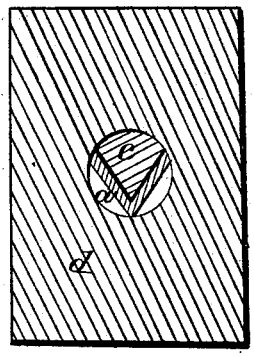
Witnesses.
E. Glay.
A. C. Patterson.
Inventor.
Andw. Patterson.

United States Patent Office.

ANDREW PATTERSON, OF BIRMINGHAM, PENNSYLVANIA.

Letters Patent No. 83,656, dated November 3, 1868.

IMPROVEMENT IN HARROW-TEETH.

The Schedule referred to in these Letters Patent and making part of the same.

*To all whom it may concern:*

Be it known that I, ANDREW PATTERSON, of the borough of Birmingham, Allegheny county, State of Pennsylvania, have invented certain new and useful Improvements in the Manner of Making and Attaching Harrow-Teeth; and I hereby declare that the following is a full, clear, and exact description thereof, reference being had to the accompanying drawings, and to the letters of explanation marked thereon, which form part of this specification.

I make my improved tooth of angle-iron or steel, and insert it through a hole in the harrow-frame, in a manner similar to that in which the ordinary solid tooth is inserted, except that, to firmly secure it in any required position, I insert a wedge or key, which fits the inner angle of the tooth and the adjacent part of the hole through which the tooth is inserted.

A most convenient mode of making these teeth is to take previously-rolled angle-iron or steel, of suitable size, cut it into proper lengths to form a single tooth, (see Figure 1,) and then cut off the corners, (*b b*, fig. 1,) when the tooth *a* is ready for use. Its proper application to the harrow-frame will be at once obvious, and is fully illustrated by the drawings, of which—

Figure 2 is a perspective, showing a part of the frame, *d*, with a tooth, *a*, inserted and held in place by the wedge *c*.

Figure 3 is a horizontal section through the frame-tooth and wedge, like letters indicating the same parts as in fig. 2.

It is proper to say that it is not absolutely necessary that the bar from which the teeth are cut should be rolled angular; it may be rolled flat, and the teeth cut in lengths, pointed, and then swaged into shape between dies. It is perhaps better to give the teeth a slightly sharper angle than ordinary angle-iron usually has. I prefer to give the sides an angle of about seventy degrees, and for teeth of one inch wide, sides about three-sixteenths is a suitable thickness for the iron. When steel is used, less thickness will be requisite.

It will thus be seen that, in substituting these angular teeth for the solid ones, about one-half of the material is saved, as well as the labor of forging the points, and the frequent scarfing of the corners to make them keep their place. My tooth can be readily adjusted to any position by any common farm-laborer. The wedges may be either metal or hard wood, of slight taper, and should be driven from the top downwards. The holes for the teeth should be the smallest through which the teeth can be conveniently driven with moderate force.

I am aware that cultivator-teeth have been fastened in their frame in a manner not differing in principle from that shown in this case. They were, however, permanently secured in one position. I do not, therefore, claim broadly fastening harrow-teeth with a wedge.

I claim, as an improved article of manufacture—

An angular iron or steel harrow-tooth, made substantially as shown and described.

ANDREW PATTERSON.

Witnesses:
 A. B. STEVENSON,
 JOHN C. STEVENSON.